J. L. SAXE.
VEHICLE SEAT-LOCK.
No. 176,695. Patented April 25, 1876.
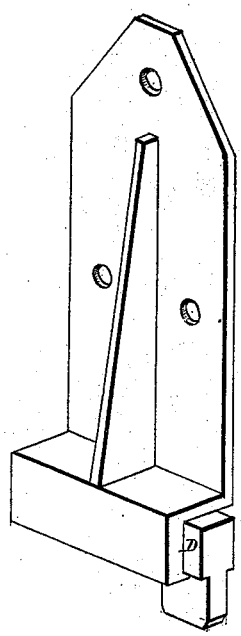
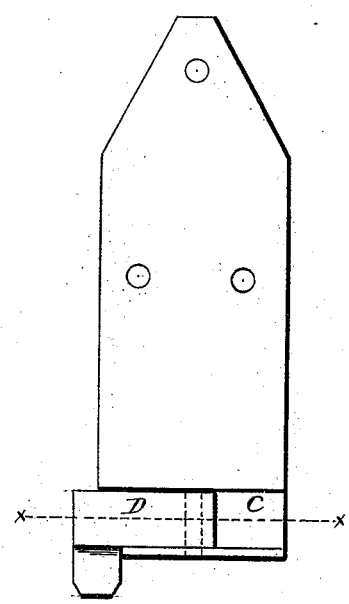
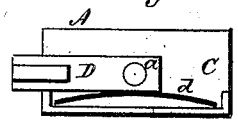
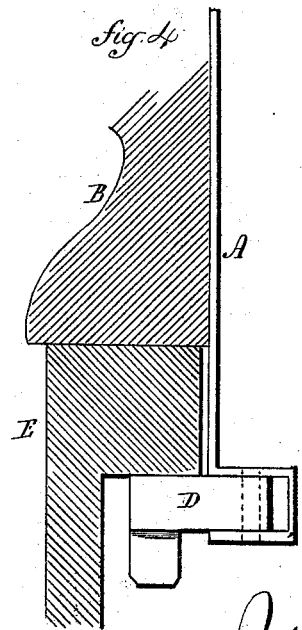

UNITED STATES PATENT OFFICE.

JOHN L. SAXE, OF WATERBURY, CONNECTICUT.

IMPROVEMENT IN VEHICLE-SEAT LOCKS.

Specification forming part of Letters Patent No. 176,695, dated April 25, 1876; application filed January 7, 1875.

*To all whom it may concern:*

Be it known that I, JOHN L. SAXE, of Waterbury, in the county of New Haven and State of Connecticut, have invented a new Lock for Shifting Carriage-Seat; and I do hereby declare the following, when taken in connection with the accompanying drawings and the letters of reference marked thereon, to be a full, clear, and exact description of the same, and which said drawings constitute part of this specification, and represent, in—

Figure 1, perspective view; Fig. 2, rear view; Fig. 3, section on $x\ x$; Fig. 4, its application.

This invention relates to a device for locking that class of carriage-seats known as "shifting seats," the object being to hold the seat down upon the rail or side of the carriage-body; and it consists in a plate formed for attachment to the seat, its lower end constructed with a recess to receive a bolt pivoted therein, and so as to lie within said recess, or be turned upon its pivot to stand out at right angles, or nearly so, (the locking position,) combined with a spring to throw and hold the bolt at either of its two extreme positions.

A is the base or plate, formed to extend up on the inside of, and be secured to, the end of the seat, as seen in Fig. 4, B representing the end of the seat. At the lower end of the plate a transverse recess, C, is formed, opening outward. In this recess the bolt D is pivoted at $a$, so as to lie back within the recess, as seen in Fig. 3, or be turned out, as seen in broken lines, same figure.

In attaching the bolt to the seat end B it is arranged so that when in place the bolt will pass close beneath the rail E of the carriage-body; hence, when turned out beneath the rail, as seen in Fig. 4, the seat will be prevented from rising from, or moving on, the rail; but when the bolt is turned back into the recess the seat is free.

In the recess back of the bolt a flat spring, $d$, is arranged, as seen in Fig. 3, pressing outward against the bolt, so that as the bolt is turned the inner angle of the bolt will depress the spring until that angle has passed the center line; then the spring will react and force the bolt either to its closed or open position, accordingly as the bolt is turned.

I claim—

The herein-described shifting-seat lock, consisting of the base or plate A, constructed with the recess C at right angles to the plane of said plate at its lower end, combined with the bolt D, pivoted in said recess so as to be turned back into said recess flush with the said plate, and the spring $d$, substantially as set forth.

JOHN L. SAXE.

Witnesses:
FRANKLIN L. WELTON,
GEO. H. COWELL.